(12) United States Patent
Dewert

(10) Patent No.: US 7,954,625 B2
(45) Date of Patent: Jun. 7, 2011

(54) QUICK-CHANGE APPARATUS FOR TRANSPORTING CONTAINERS

(75) Inventor: Andreas Dewert, Obertraubling (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 12/435,811

(22) Filed: May 5, 2009

(65) Prior Publication Data
US 2009/0277750 A1 Nov. 12, 2009

(30) Foreign Application Priority Data

May 8, 2008 (DE) .......................... 10 2008 022 611

(51) Int. Cl.
*B65G 29/00* (2006.01)
(52) U.S. Cl. ................ 198/473.1; 198/479.1; 198/481.1
(58) Field of Classification Search ............... 198/478.1, 198/479.1, 480.1, 481.1, 473.1, 474.1
See application file for complete search history.

(56) References Cited

U.S. PATENT DOCUMENTS

| | | | | |
|---|---|---|---|---|
| 2,985,283 | A * | 5/1961 | Carter | 198/481.1 |
| 5,056,650 | A * | 10/1991 | Kronseder | 198/480.1 |
| 5,082,105 | A * | 1/1992 | Tincati | 198/473.1 |
| 5,533,608 | A * | 7/1996 | Adams et al. | 198/478.1 |
| 5,582,285 | A * | 12/1996 | Kronseder | 198/473.1 |
| 2002/0081189 | A1* | 6/2002 | Giometti | 414/791.2 |
| 2006/0108198 | A1* | 5/2006 | Guidetti | 198/431 |
| 2008/0257687 | A1* | 10/2008 | Hermann et al. | 198/469.1 |

FOREIGN PATENT DOCUMENTS

| | | |
|---|---|---|
| DE | 195 39 694 A1 | 5/1996 |
| DE | 10 2005 002 510 A1 | 7/2006 |
| DE | 60 2004 008 789 T2 | 1/2008 |
| EP | 1141561 A | 10/2001 |
| WO | 2007125553 A | 11/2007 |

OTHER PUBLICATIONS

European Search Report for European Application No. 09159151.1 dated Jul. 29, 2009.

* cited by examiner

*Primary Examiner* — James R Bidwell
(74) *Attorney, Agent, or Firm* — Rissman, Hendricks & Oliverio, LLP

(57) ABSTRACT

An apparatus for transporting containers may include a transport body having at least two segments. The transport body is arranged such that it can rotate about a predefined geometric axis of rotation. The transport body has a plurality of openings and, on its outer circumference, a plurality of recesses for receiving at least one region of the containers to be transported. The apparatus comprises a plurality of holding bodies for holding the transport body. An extension direction of the holding bodies extends at an angle other than 0° relative to a plane of the transport body. At least one engagement region of each of the holding bodies is arranged in each case in one of the openings. According to the disclosure, the cross section of at least some of these openings is larger than the cross section of the engagement region of the holding bodies which is arranged in these openings, so that the segments are movable at least at times relative to the holding bodies in a direction perpendicular to the axis of rotation.

20 Claims, 3 Drawing Sheets

QUICK-CHANGE APPARATUS FOR TRANSPORTING CONTAINERS

CROSS-REFERENCE TO RELATED APPLICATION

This application claims the benefit of priority of German Patent Application No. 10 2008 022 611.4, filed May 8, 2008, pursuant to 35 U.S.C. 119(a)-(d), the disclosure of which is incorporated herein by reference in its entirety as if fully set forth herein.

TECHNICAL FIELD

The present disclosure relates to an apparatus for transporting containers and, more particularly, to a quick-change apparatus for transporting containers.

BACKGROUND

The apparatus will be described with reference to a bottle closing machine which closes the containers in particular with crown caps. However, it is pointed out that the apparatus according to the invention can be used for other transport apparatuses for containers. Such bottle closing machines often have, as transport devices, transport wheels or transport rings which have on their outer circumference receiving pockets for the containers and which are arranged such that they can rotate about a defined axis of rotation.

For example, WO 2007/125553 A1 describes a star wheel which comprises a plurality of segments arranged on a common carrier. Here, the segments can be pivoted relative to the carrier for dismantling purposes. In working operation, therefore, the star wheel must be secured against rotation relative to the carrier.

U.S. Pat. No. 4,075,086 discloses a treatment apparatus for treating glass containers. Here, too, a transport wheel is provided which has on its outer circumference individually replaceable recess bodies in which the neck regions of the containers engage.

DE 10 2004 056 858 A1 describes a conveying device. In this conveying device, an outer guide which is arranged around a transport wheel is formed as multiple segments.

DE 195 39 694 A1 discloses a quick-change star wheel for a closing machine. In this case, a segmented star wheel is provided, but in order to replace the latter a system part must be moved in the direction of the axis of rotation of this star wheel in order to be able to replace the star wheel.

U.S. Pat. No. 5,689,932 describes a quick-change method for filling and closing machines. Here, a rotatable star wheel is provided, in which a plurality of carrier devices are releasably arranged. When changing to a different fitting, however, the individual carrier devices must be replaced separately.

DE 101 57 918 A1 discloses a star wheel for a glass container testing machine. This arrangement comprises a rotatable vertical shaft and upper and lower hub arrangements which are fixed to the shaft.

It may be desirable to provide a transport device which allows a rapid change of fitting and at the same time allows safe operation.

SUMMARY OF THE INVENTION

An apparatus according to the disclosure for transporting containers comprises a transport body having at least two segments. The transport body being arranged such that it can rotate about a predefined geometric axis of rotation. The transport body having a plurality of openings and, on its outer circumference, a plurality of recesses for receiving at least one region of the containers to be transported. The apparatus also comprises a plurality of holding bodies for holding the transport body or the segments thereof. An extension direction of these holding bodies extends at an angle other than 0° relative to a plane of the transport body, and at least one engagement region of each of these holding bodies is arranged in each case in one of the openings.

According to the disclosure, the cross section of at least some of these openings is larger than the cross section of the engagement region of the holding bodies which is arranged in these openings, so that the segments are movable at least at times relative to the holding bodies in a direction perpendicular to the axis of rotation.

While in some of the apparatuses known from the prior art a detachment of the transport body takes place by a movement in the direction of the axis of rotation, which is often difficult to achieve, the openings and the engagement regions mean that the transport body does not have to be moved in the longitudinal direction of the axis of rotation but rather can also be moved perpendicular thereto for detachment purposes. In general, the invention makes it possible for the segments of the transport body or transport wheel to be moved in a different direction than the direction of the axis of rotation.

According to some aspects of the disclosure, the holding bodies are holding rods and the extension direction is a longitudinal direction of these holding rods. However, it would also be possible that the holding bodies are L-shaped for example and one part of the holding bodies extends in the direction of the axis of rotation and another region is perpendicular thereto. In some aspects, the holding rods extend perpendicular to the plane of the transport body, and in further aspects the holding rods extend upwards from the transport body.

A movement in the plane of the transport body is in particular a radial movement of the segments, but a movement in the circumferential direction would also be conceivable. According to various aspects of the disclosure, the recesses are arranged directly in the transport body or are integrally formed in this transport body. This means that, contrary to some of the apparatuses known in the prior art, the recesses cannot be separated from the transport body.

In a further aspect, the apparatus comprises at least one connection device for releasably connecting the segments to one another.

In order to replace the transport body, firstly the connection devices are released and then the segments can be moved preferably in the radial direction but in particular in a plane perpendicular to the axis of rotation.

In a further exemplary embodiment, at least one opening has a circular opening section and an elongate hole adjoining this circular section. According to some aspects, all the openings of a segment in each case have circular opening sections and elongate holes adjoining these circular opening sections, wherein the elongate holes extend preferably in essentially the same direction relative to the circular opening sections. In this way it is possible that, after releasing the abovementioned connection device, the two segments can be moved in a certain preferred direction, which is defined by the direction of the elongate holes, and then can be removed from the apparatus preferably by a movement in the direction of the axis of rotation. The openings may comprise holes and, in some aspects, holes that extend perpendicular to the plane of the transport body.

The elongate holes may run in a straight line. However, it would also be possible that the elongate holes are curved at least in some sections.

In some exemplary aspects, the holding bodies have a circumferential groove in the engagement region, wherein the smallest diameter of this groove is smaller than the width of the elongate hole. This means that no displacement of the segments or of the transport body in the direction of the axis of rotation relative to the holding body is possible in the arrested state, but in the unlocked state the segments can be displaced relative to the holding bodies.

According to various aspects, the circumferential groove has a circular cross section and the diameter of this circular groove is smaller than the width of the elongate hole, so that the engagement region can be displaced relative to the groove.

In some aspects, an end body of the holding bodies can be passed through at least one region of the opening. The end body is understood here to mean in particular the lowermost section of the holding bodies or holding rods. As a result of this embodiment, the segments of the transport body can firstly be inserted or removed in the direction of the axis of rotation and then displaced in particular relative to the elongate holes.

In various aspects, an end body of the holding bodies cannot be passed through at least one region of the openings. The region may comprise the aforementioned elongate holes of the openings.

In an exemplary embodiment, the connection device comprises a pivotable lever which is arranged on one segment and which has a recess that engages behind a bolt arranged on another segment in order to connect the segments. In this case, the lever can preferably be actuated manually without using a tool. This allows a very quick change of fittings without using a tool, by firstly releasing said lever and then removing the segments.

According to various aspects, the elongate holes are arranged in such a way that the segments can be moved in a direction perpendicular to a line of separation between the segments.

In some aspects, none of the elongate holes extends in the circumferential direction of the transport body. This increases the stability during operation, since a rotation of the transport body relative to the holding bodies is prevented by the extension directions of all the elongate holes.

According to an exemplary embodiment, at least one holding body has a pretensioned body which is movable relative to the end body in the longitudinal direction of the holding body. In this way, an arresting of the transport body is achieved in the assembled state. In this case, it is possible for example that the pretensioned body is mounted by an O-ring relative to the holding rod and this O-ring at the same time acts as an elastic element which generates a pretension in the pretensioned body. In some aspects, the abovementioned engagement region is arranged between the star body and the pretensioned body in the longitudinal direction of the holding body.

The present disclosure also relates to an apparatus of the type described above, wherein all the holding rods are arranged on a common carrier. In this way, the stability of the apparatus is increased.

The present disclosure also relates to an installation for closing containers with closures, which comprises an apparatus of the type described above and a closing device which applies the closures securely to the containers.

Further advantages and embodiments will emerge from the appended drawings.

DETAILED DESCRIPTION

Figure 1:
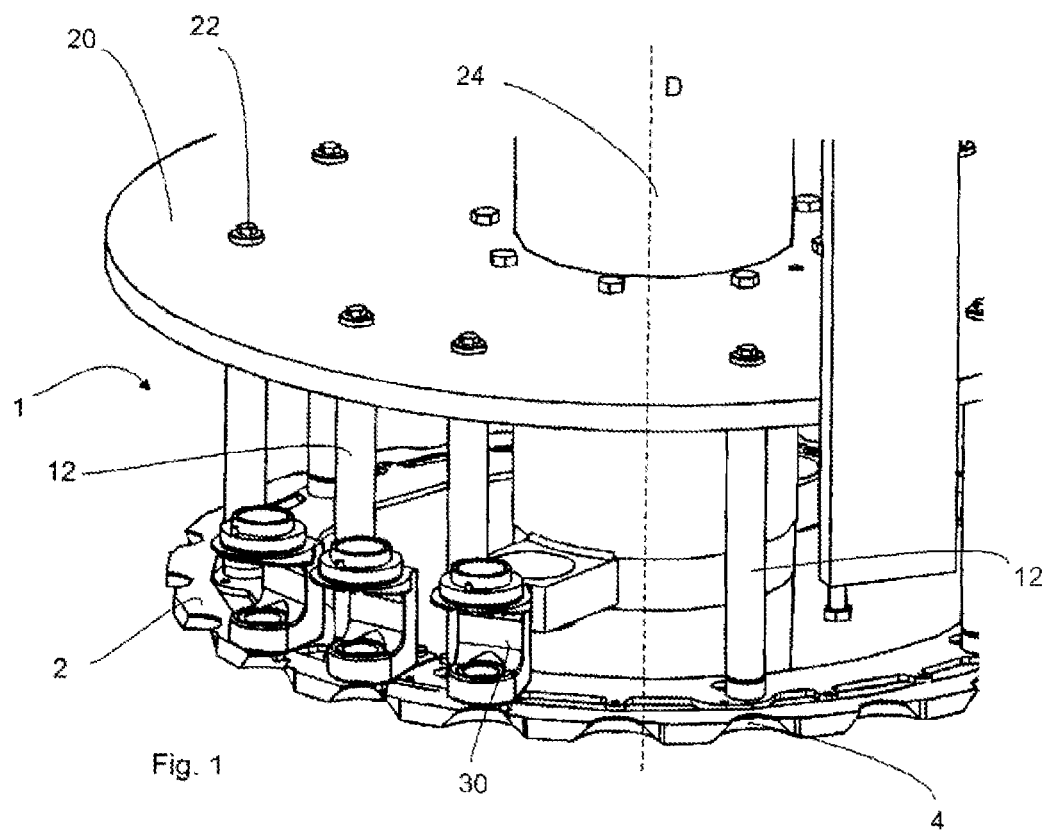
FIG. 1 shows a partial view of a transport device for containers according to the invention.

FIG. 1 shows an apparatus 1 according to the invention for transporting containers (not shown), more specifically an apparatus for equipping containers with crown caps. Here, a plurality of closing devices 30 are provided which are arranged around a transport body 2 in the circumferential direction thereof and above the same. Arranged on the outer circumference of this transport body are recesses 4, in which neck regions of the containers that are to be transported and closed can engage. This transport body, which has an annular shape here, is arranged such that it can rotate about an axis of rotation D. A plurality of holding bodies 12 are also provided, on which the transport body 2 is securely arranged during working operation. These holding bodies 12 are in turn screwed into a common carrier 20 by means of screws 22. Reference 24 denotes a shaft, on which the transport body 2 is arranged for rotation about the axis of rotation D.

The apparatus additionally comprises a further guide rail (not shown) which is arranged in a stationary manner and runs radially outside the transport body 2. The containers are guided between this outer guide rail and the transport body, more specifically the containers are guided at one side in the recesses 4 and at the other side against an inner circumference of this further guide rail.

Figure 2A:
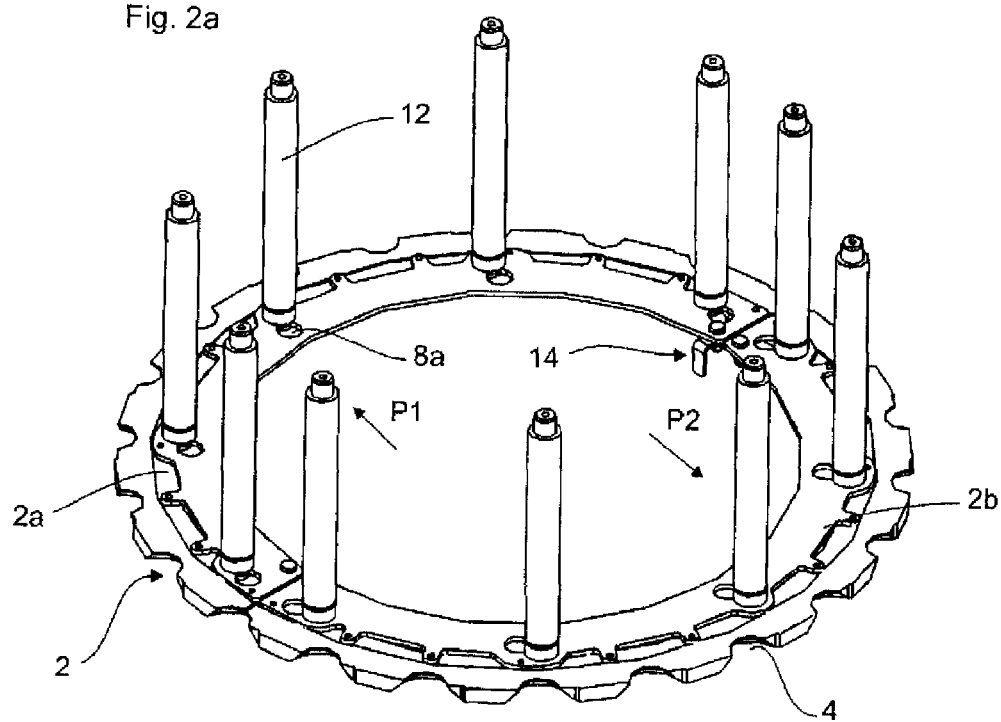
FIG. 2a shows a transport body with holding bodies in a first view.

FIG. 2a shows a transport body 2 with holding bodies 12 arranged thereon. Here, the transport body 2 is composed of two segments 2a and 2b which in each case have a semicircular profile. The two segments 2a and 2b are releasably connected to one another by means of a connection device 14.

The individual holding bodies 12 extend perpendicular to the plane of the transport body 2. The longitudinal directions of the holding bodies 12 thus also extend parallel to the axis of rotation (not shown in FIG. 2a) of the transport body.

The transport body 2 is formed here in two parts, but the two parts of the transport body 2 are permanently and securely connected to one another by means of riveted connections for example. However, it would also be possible to form the transport body 2 in one piece. It can be seen that the recesses 4 are arranged at equal distances from one another on the outer circumference and here have a profile specially adapted to the containers that are to be transported.

The present invention was developed so as to be able to convert such a transport apparatus in a flexible manner.

Provided in the transport body 2 is a plurality of openings, of which just one opening section 8a can be seen here in each case and a section of the holding body extends through a further section of this opening. However, it can be seen that the cross section of these openings is in any case larger than the cross section of the region of the holding body which passes through the openings. In order to release the segments from the holding bodies, firstly the connection device 14 and a further connection device 14 are released. The left-hand segment shown in FIG. 2*a* can then be pulled in the direction of the arrow P1 in FIG. 2*a* and the segment 2*b* can be pulled in the direction of the arrow P2. In this way, end bodies (not shown) of the holding bodies then pass into the region of the circular openings 8*a* and can then be removed in the downward direction, i.e. downwards in the longitudinal direction L of the holding bodies. It should be noted here that the position of the holding bodies 12 need not be altered during this changeover process.

Figure 2B:
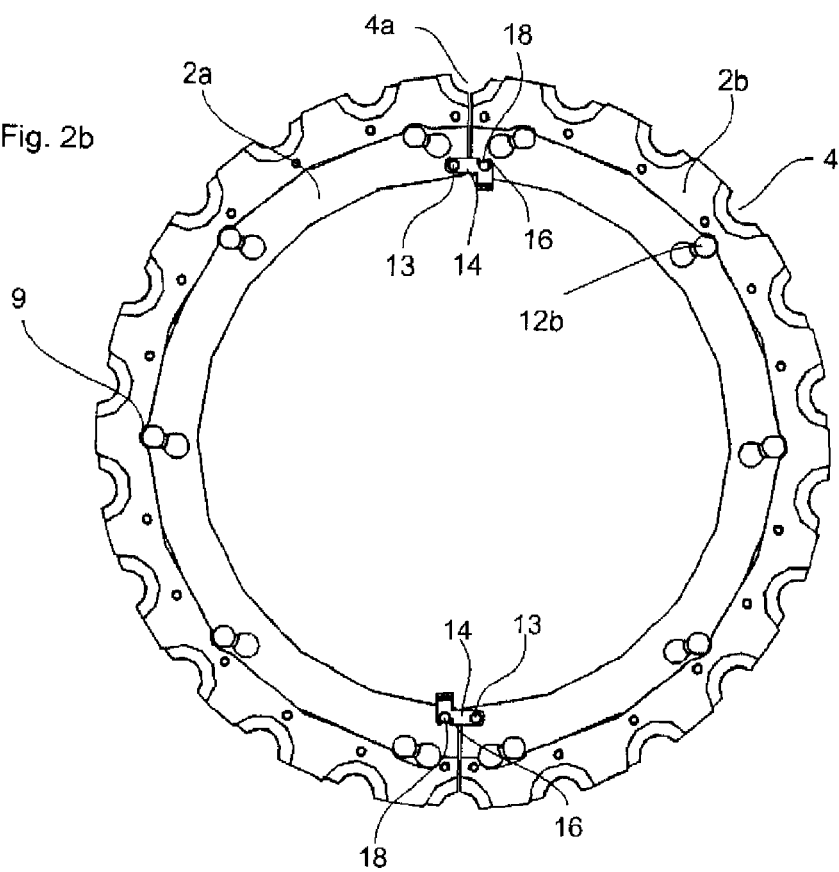
FIG. 2b shows a transport body in a view from below.

FIG. 2*b* shows a plan view from below of the arrangement shown in FIG. 2*a*. End bodies 12*b* of the holding bodies 12 can be seen here. These end bodies 12*b* can be passed through the openings 8*a* for installation purposes and then displaced in grooves or elongate holes adjoining an opening 8*a*, i.e. more specifically the respective segment 2*a* or 2*b* is displaced. Reference 14 denotes a closing lever for connecting the two segments 2*a*, 2*b* to one another. This closing lever 14 can be pivoted about a first bolt 13 and has at the other side a recess 16 which engages in a further bolt 18. In this way, it is possible quickly to lock the two segments 2*a* and 2*b* to one another without using a tool. In this locked state, the two segments are additionally also held by the individual holding bodies 12 or the end bodies 12*b* of these holding bodies 12.

It can be seen that in the region of the transition between the two segments 2*a* and 2*b*, a corresponding recess 4*a* is formed only once these two segments are joined together. This means that half a recess is located in each case in the edge region of each segment. However, it would also be possible that the two segments 2*a* and 2*b* are connected to one another in a region in which no recesses 4 are provided.

It can be seen that most holding bodies 12 are arranged at equal distances from one another in the circumferential direction. Only in the region in which the two segments 2*a* and 2*b* are joined to one another are the holding bodies 12 arranged at a smaller distance from one another, since in this region a greater stability of the arrangement is required.

Figure 3A:
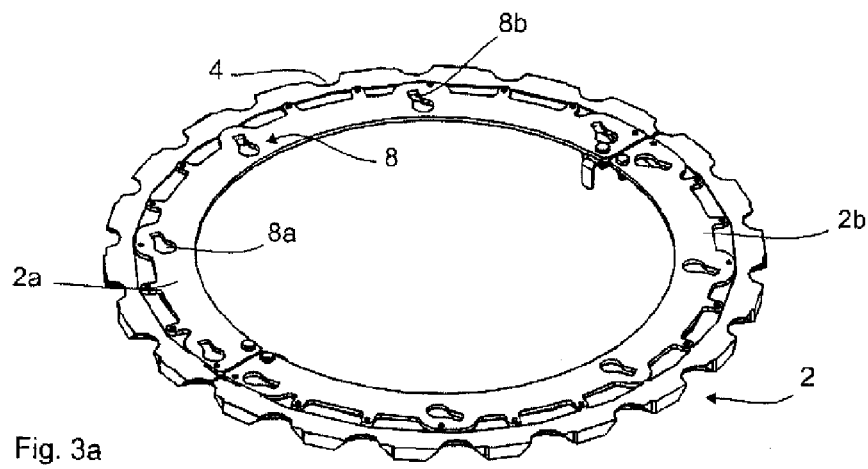
FIG. 3a shows a perspective view of the transport body.

FIG. 3 shows a perspective view of a transport body 2 or of the two segments 2*a* and 2*b*. It can be seen here that the connection device is arranged on the underside of the transport body 2. Here, the individual openings 8 in each case have a circular opening section 8*a* and an elongate hole 8*b* extending in the manner of a groove from this opening section 8*a*.

The individual recesses 4 taper here from the bottom upwards in order to be able to be adapted to the neck of containers, as mentioned above.

Figure 3B:
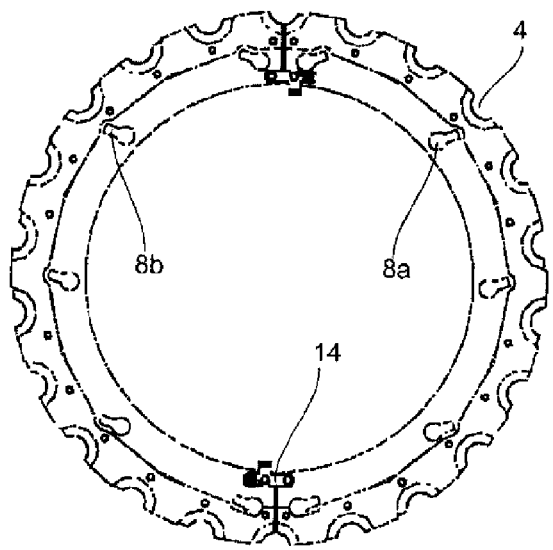
FIG. 3b shows a plan view of the transport body of FIG. 3a from below.

FIG. 3*b* shows a view of a transport body 2 from below. It can be seen that the respective elongate holes 8*b* in each case extend outwards and recesses 9 adapted to said elongate holes run in each case in the region thereof in the transport body 2.

Figure 3C:
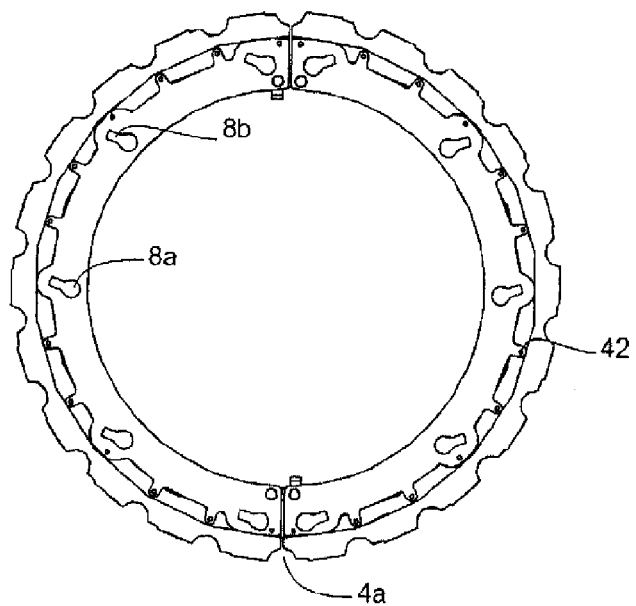
FIG. 3c shows a plan view of the transport body of FIG. 3a from above.

FIG. 3*c* shows a view of a transport body 2 from above. There can be seen here a plurality of riveted connections 42, by means of which the two parts of this transport body are fixed to one another. The elongate holes 8*b* of the individual openings 8 of a segment extend in each case essentially in the same direction, as shown in FIG. 3*c*. In this way, it is possible to move the corresponding segment in precisely one direction in FIG. 3*c* in the plane of the figure in order to remove it. In any case, the extension directions of these elongate holes are adapted to one another in such a way that the respective segment can be detached by a precisely defined movement.

Here, the individual openings 8 are arranged in such a way that the elongate holes thereof all extend in the same direction, but preferably none of these elongate holes extends precisely in the circumferential direction of the transport body 2. In this way, even during operation, the transport body is fixed by all the holding bodies also in the circumferential direction. Furthermore, it would also be possible in the two segments to arrange the openings thereof as a function of the transport direction of the containers. For example, individual elongate holes could extend in the circumferential direction and specifically in the direction of rotation of the transport body during working operation.

Figure 4:
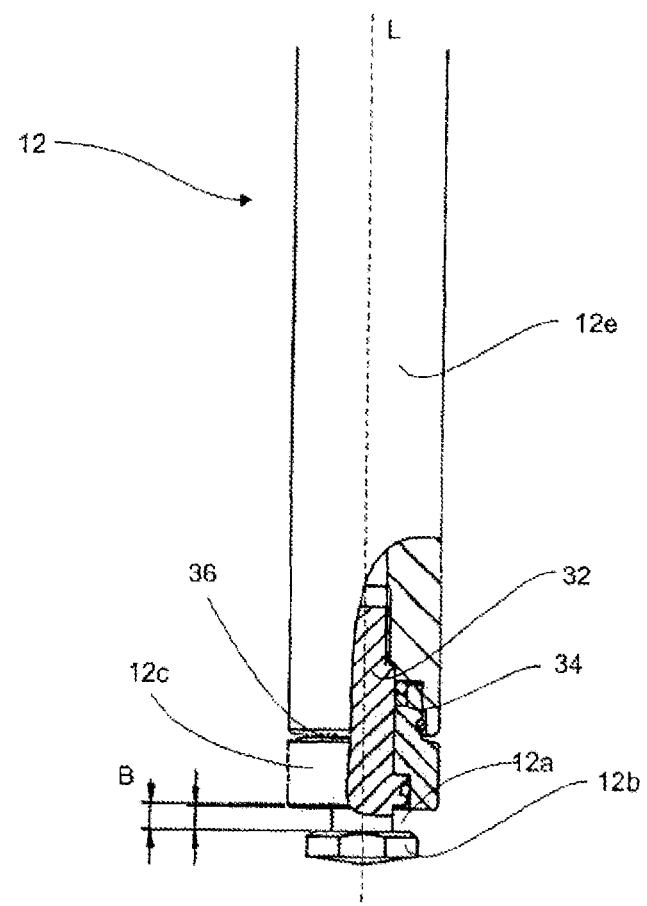
FIG. 4 shows a sectional view of a holding body.

FIG. 4 shows a view of a holding body 12 in partial section. Arranged in this holding body 12 is an end body 12*b* which fits through the opening 8*a* but not through the elongate hole 8*b*. An engagement region 12*a* of the holding body rests in the elongate hole 8*b* in the assembled state. In this case, a width B of this engagement region is adapted to the thickness of the transport body or transport wheel 2. Preferably, this distance differs from the thickness of the transport body by less than 0.5 mm, preferably less than 0.4 mm and particularly preferably less than 0.2 mm.

The end body 12*b*, which as mentioned above engages behind the elongate hole 8*b*, is securely connected to the main body 12*e* of the holding body 12 via a connection bolt 32 in the longitudinal direction L. Reference 12*c* denotes a pretensioned body which rests in a lower section of the main body 12*e* and can be moved slightly in the longitudinal direction L by an elastic means such as an O-ring 34. The elastic means may also be designed for example as a spring element, flexible ring or other suitable means, such as e.g. by magnetic force. In this way, when the holding body is introduced into the elongate hole 8*b*, the holding body 12 can be pretensioned with the transport body 2. Reference 36 denotes a gap or intermediate space which permits a slight movement of the pretensioned body 12*c* in the longitudinal direction L. The end body 12*b* is designed here as a cylinder with a key surface similar to a hexagon screw which is screwed into the connection bolt 32.

If the clamping force is not sufficient for a defined material thickness of the segment, it is also possible to place an O-ring or the like in the engagement region 12*a* or above the pretensioned body 12*c*.

It will be apparent to those skilled in the art that various modifications and variations can be made to the apparatus for transporting containers of the present disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:

1. Apparatus for transporting containers, comprising:
   a transport body having at least two segments, the transport body being arranged such that it can rotate about a predefined geometric axis of rotation and having a plurality of openings in the segments, the transport body having a plurality of recesses on its outer circumference for receiving at least one region of the containers to be transported; and
   a plurality of holding rods for holding the transport body, the plurality of holding rods being arranged on a common carrier, an extension direction of said holding rods extending at an angle other than 0° relative to a plane of the transport body, and
   wherein at least one engagement region of each of said holding rods is arranged in each case in one of the openings, and
   wherein the cross section of at least some of said openings is larger than the cross section of the engagement region of the holding rods, which are arranged in the openings, so that the segments are movable, at least at times, relative to the holding rods in a direction perpendicular to the axis of rotation.

2. Apparatus according to claim 1, wherein the extension direction is a longitudinal direction of the holding rods.

3. Apparatus according to claim 1, wherein the apparatus comprises at least one connection device for releasably connecting the segments to one another.

4. Apparatus according to claim 1, wherein at least one of said openings has a circular opening section and an elongate hole adjoining the circular section.

5. Apparatus according to claim 3, wherein all the openings of at least one of the segments have circular opening sections and elongate holes adjoining the circular sections, wherein the elongate holes extend in essentially the same direction relative to the circular opening sections.

6. Apparatus according to claim 1, wherein the holding rods have a circumferential groove in the engagement region, and wherein the smallest diameter of said groove is smaller than the width of the elongate hole.

7. Apparatus according to claim 1, wherein an end body of the holding rods can be passed through at least one region of the opening.

8. Apparatus according to claim 1, wherein an end body of the holding rods cannot be passed through at least one region of the openings.

9. Apparatus according to claim 3, wherein the connection device comprises a pivotable lever arranged on one of said segments, the pivotable lever having a recess that engages behind a bolt arranged on another of said segments in order to connect the segments.

10. Apparatus according to claim 9, wherein the lever is manually actuable without using a tool.

11. Apparatus according to claim 4, wherein none of the elongate holes extends in the circumferential direction of the transport body.

12. Apparatus according to claim 1, wherein at least one of said holding rods has a pretensioned body which is movable relative to the end body in the longitudinal direction of the holding rod.

13. Apparatus according to claim 12, wherein the pretensioned body is pretensioned relative to the end body.

14. Installation for closing containers with closures, comprising:
   an apparatus according to claim 1; and
   a closing device that applies the closures securely to the containers.

15. Apparatus for transporting containers, comprising:
   a transport body having at least two segments, the transport body being rotatable about a predefined geometric axis of rotation and having a plurality of openings in the segments, the transport body having a plurality of recesses on its outer circumference for receiving at least one region of the containers to be transported; and
   a plurality of holding rods for coupling the transport body to a common carrier for rotation about said predefined geometric axis of rotation, said holding rods extending from said transport body in a direction forming an angle other than 0° relative to a plane of the transport body,
   wherein at least one engagement region of each of said holding rods is arranged in each case in one of the openings, and
   wherein the cross section of at least some of said openings is larger than the cross section of the engagement region of the holding rods, which are arranged in the openings, so that the segments are movable, at least at times, relative to the holding rods in a direction perpendicular to the axis of rotation.

16. Apparatus according to claim 15, wherein said plurality of holding rods are arranged on a common carrier.

17. Apparatus according to claim 15, wherein the extension direction is a longitudinal direction of the holding rods.

18. Apparatus according to claim 15, wherein the apparatus comprises at least one connection device for releasably connecting the segments to one another.

19. Apparatus according to claim 15, wherein at least one of said holding rods has a pretensioned body which is movable relative to the end body in the longitudinal direction of the holding rod.

20. Apparatus according to claim 19, wherein the pretensioned body is pretensioned relative to the end body.

* * * * *